(No Model.) 6 Sheets—Sheet 1.

W. H. LENHART.
LATHE FOR TURNING ECCENTRIC OR POLYGONAL FORMS.

No. 437,339. Patented Sept. 30, 1890.

Witnesses
Edw. A. Muir
F. P. Davis

Inventor
William H. Lenhart
By his Attorneys
R. Y. DuBois

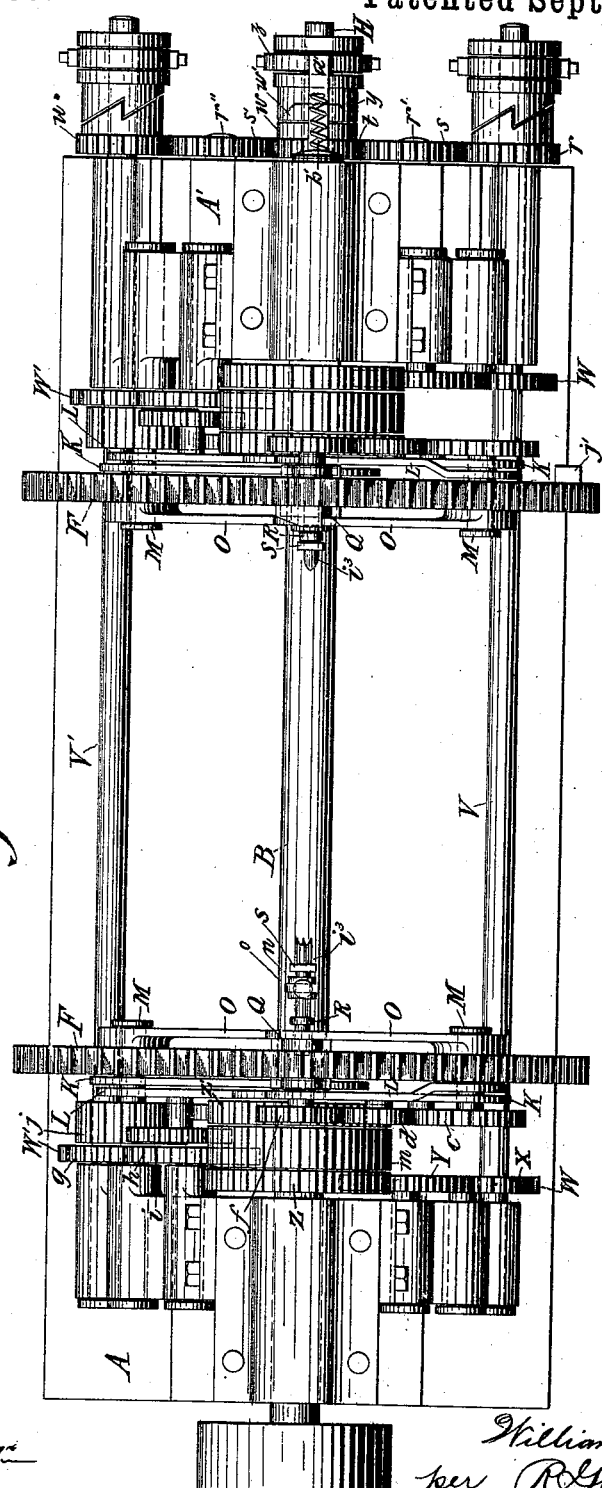

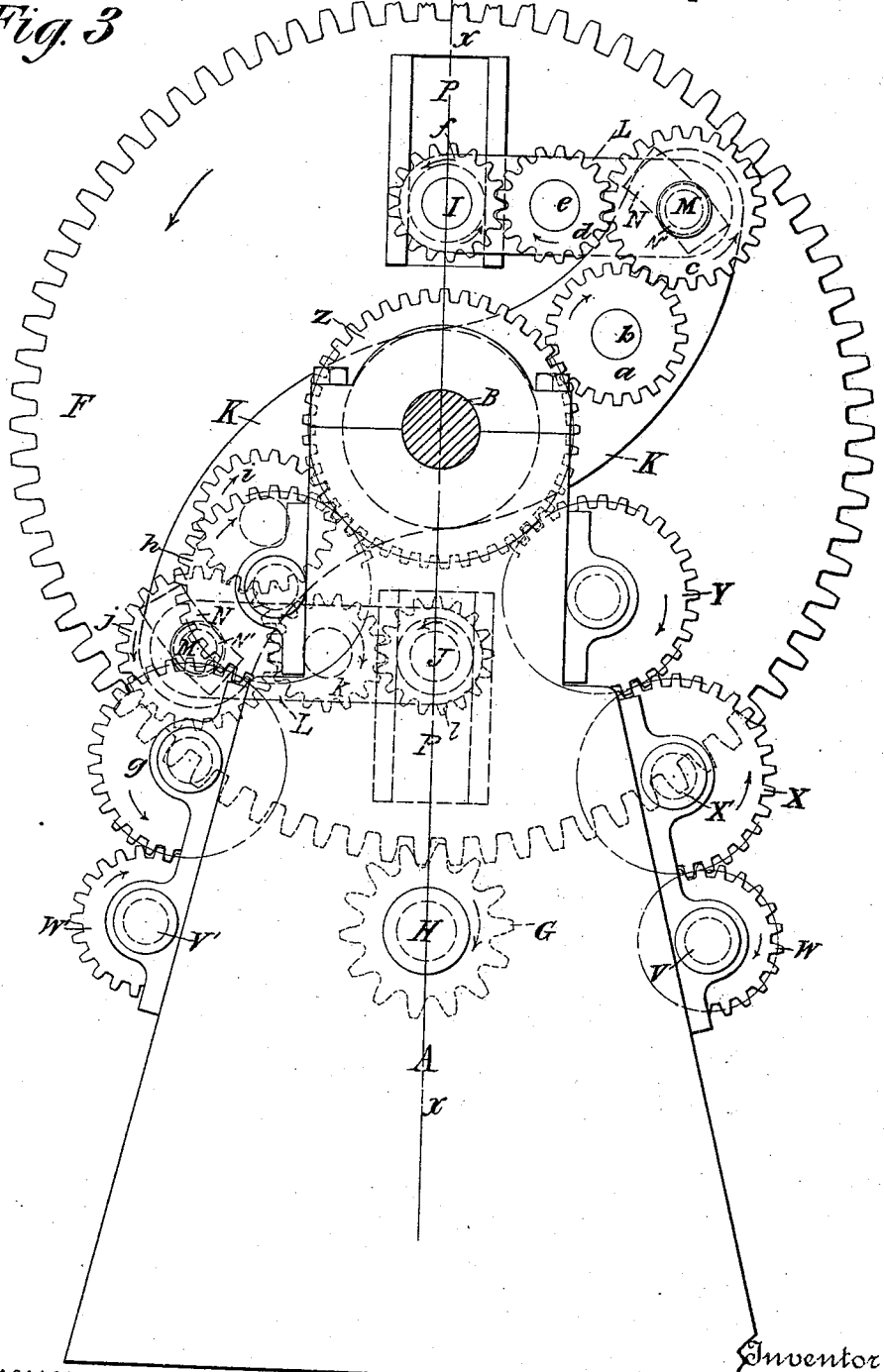

(No Model.) 6 Sheets—Sheet 4.
W. H. LENHART.
LATHE FOR TURNING ECCENTRIC OR POLYGONAL FORMS.
No. 437,339. Patented Sept. 30, 1890.
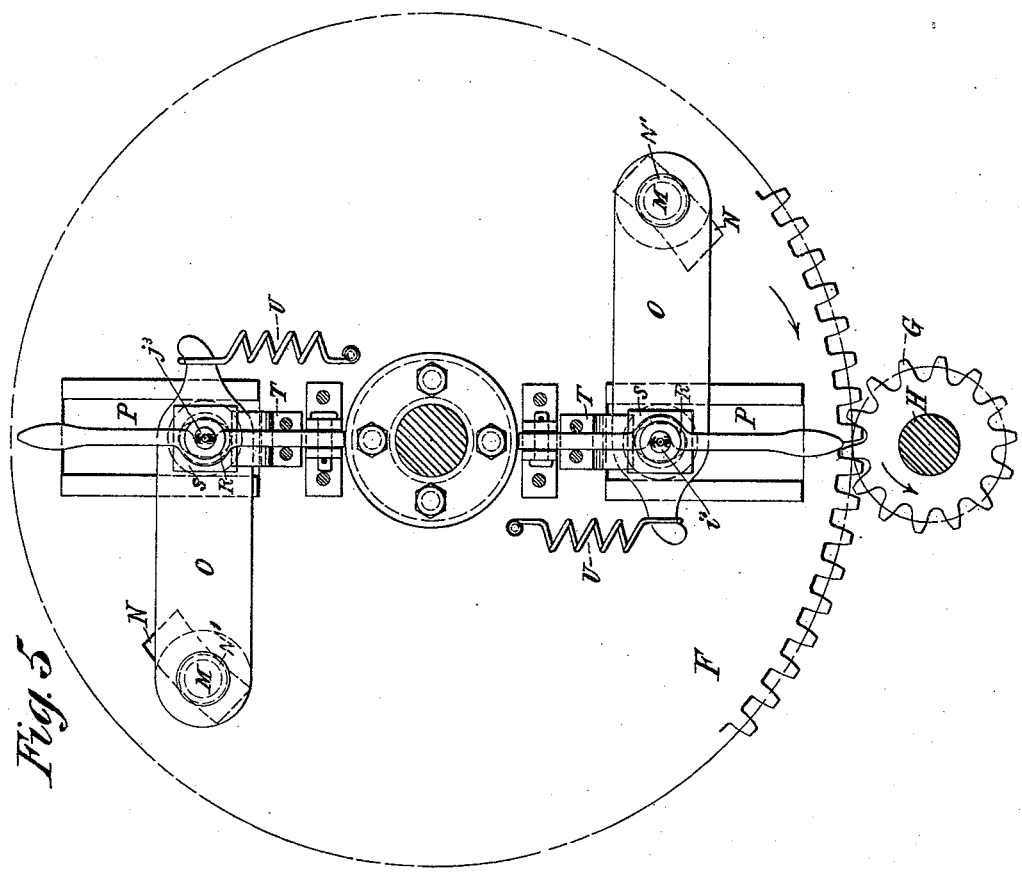
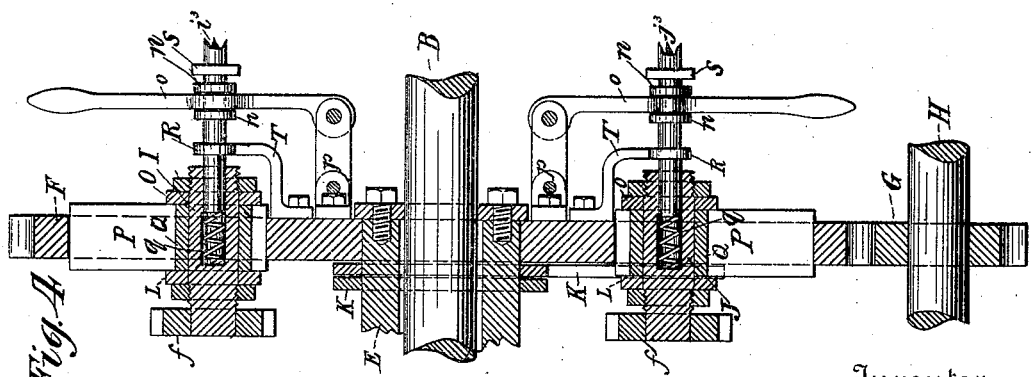
Witnesses
Edw. A. Muir
F. P. Davis
Inventor
William H. Lenhart
per R. S. Du Bois
his Attorney (No Model.) 6 Sheets—Sheet 5.

W. H. LENHART.
LATHE FOR TURNING ECCENTRIC OR POLYGONAL FORMS.

No. 437,339. Patented Sept. 30, 1890.

Witnesses
Edw. A. Muir
J. P. H...

Inventor
William H. Lenhart
per R. G. DuBois
his Attorney.

(No Model.) 6 Sheets—Sheet 6.
W. H. LENHART.
LATHE FOR TURNING ECCENTRIC OR POLYGONAL FORMS.
No. 437,339. Patented Sept. 30, 1890.
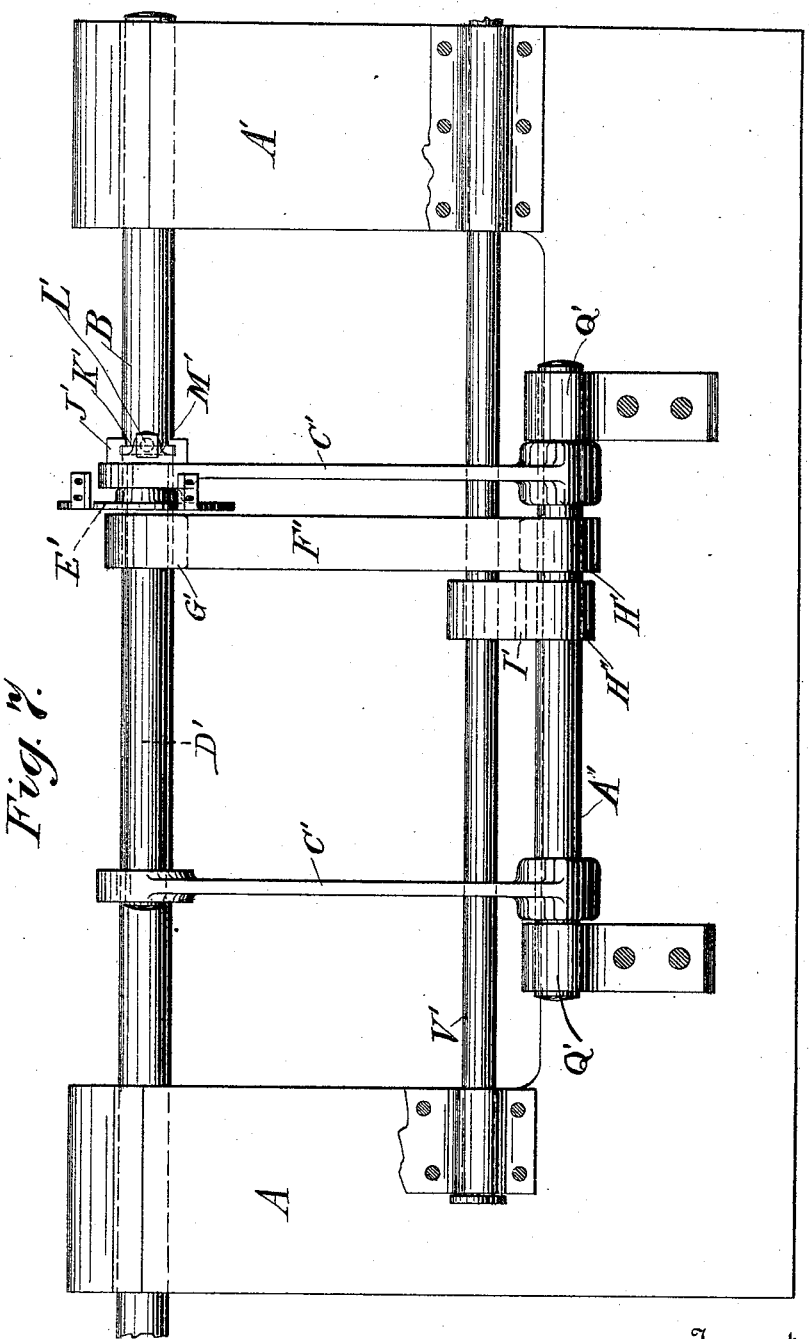

UNITED STATES PATENT OFFICE.

WILLIAM H. LENHART, OF DEFIANCE, OHIO.

LATHE FOR TURNING ECCENTRIC OR POLYGONAL FORMS.

SPECIFICATION forming part of Letters Patent No. 437,339, dated September 30, 1890.

Application filed May 14, 1890. Serial No. 351,786. (No model.)

*To all whom it may concern:*

Be it known that I, WILLIAM H. LENHART, a citizen of the United States, residing at Defiance, in the county of Defiance and State of Ohio, have invented certain new and useful Improvements in Lathes for Turning Eccentric or Polygonal Forms; and I do hereby declare the following to be a full, clear, and exact description of the invention, such as will enable others skilled in the art to which it appertains to make and use the same.

My invention relates to that class of lathes specially adapted for turning eccentric or polygonal forms, but more particularly rived or split spokes.

The object sought to be accomplished is to construct a machine which shall be partially automatic in its operation and in which the blank is dogged in by hand, then carried half-way round the cutter-heads, and there squared, while at the same time a second blank is being introduced, after which the revolution is continued and the finishing of the first spoke accomplished, the second one being meanwhile brought to the squaring-point and treated in like manner to the first.

With these ends in view my invention consists in certain peculiarities of construction and combinations of parts more fully set forth hereinafter, and pointed out in the claims.

Figure 1:
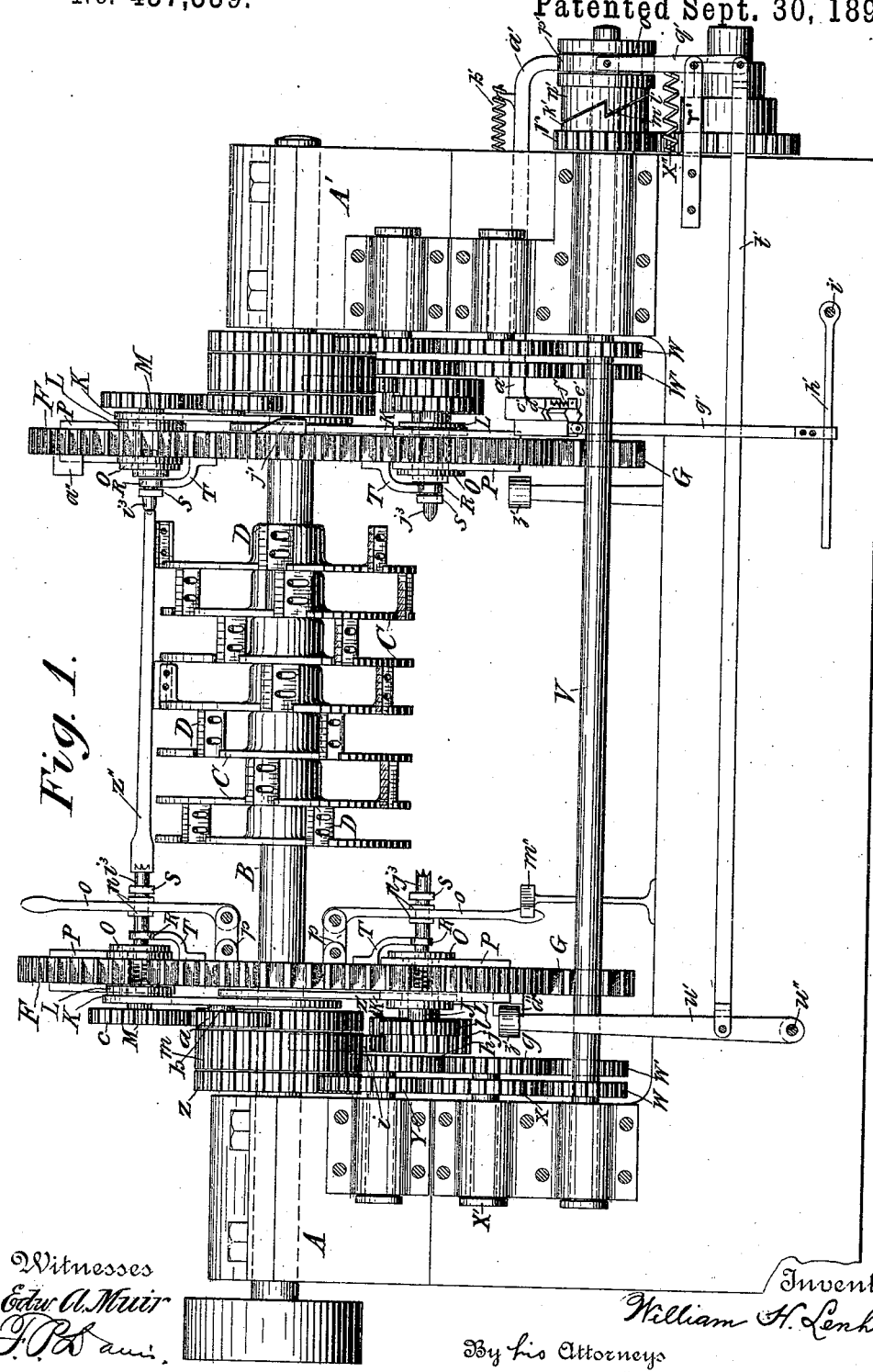
Figure 6:
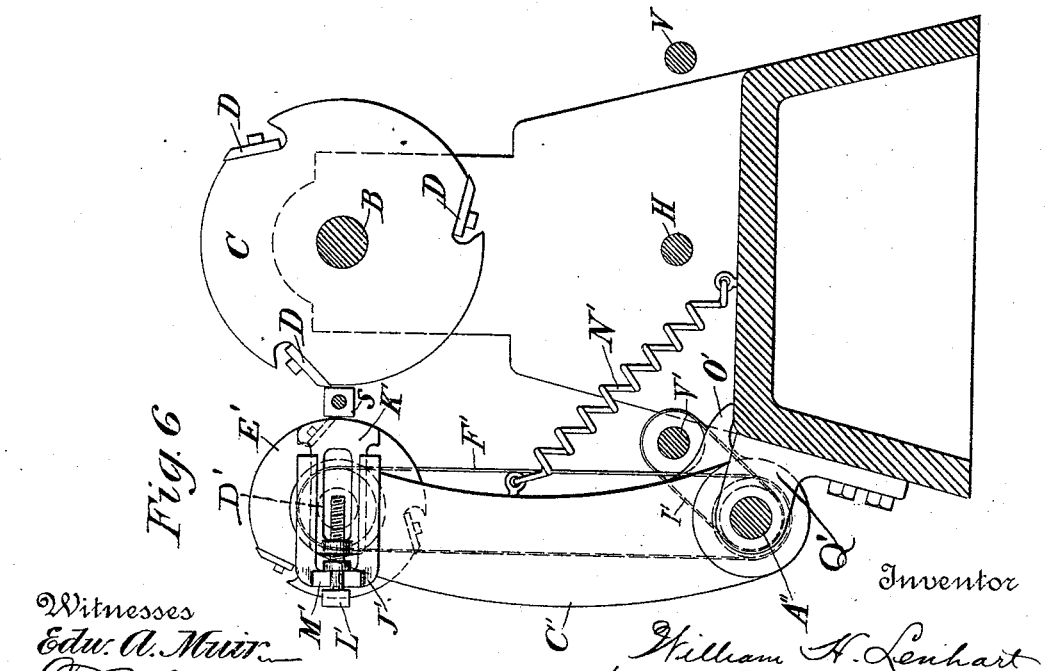

Referring to the accompanying drawings, Figure 1 is a front elevation of my complete device; Fig. 2, a plan view with the cutter-heads and shaft removed; Fig. 3, an end view; Fig. 4, a section through one of the large disks and connections on line $x$ $x$ of Fig. 3; Fig. 5, a detail view of one of said disks, looking at the inside of the same; Fig. 6, a section through line $y$ $y$ of Fig. 1, showing the squaring-head; Fig 7, a rear view of the machine, and Figs. 8 and 9 detail views showing the mechanism for throwing the large disks out of gear.

The reference-letters A A' denote the end sections of the frame or casing for supporting the machine and in which the main shaft B is journaled. The cutter-heads C are mounted on this shaft and are of the usual form, being provided with knives D, and they are revolved with said shaft entirely independent of the rest of the machine.

A sleeve E surrounds the shaft B at each end, and is secured to the frame or casing, and on these sleeves are loosely mounted the usual large toothed disks F, which carry the spindles and are actuated by the pinions G on a shaft H directly beneath the main shaft B and journaled in the end pieces A A' of the frame. A pair of spindles or centers J J are mounted in each of these disks as follows: A pair of plates K are loosely fitted on the sleeve E, and extend in opposite directions, bearings against the outside of the disk, and a second pair of plates L are disposed beneath the outer ends of the main plates, and they also extend oppositely. These two sets of plates are pivotally connected together by a pin or bolt M, extending through them and also through a curved slot N in the disk, a friction-roller N' being placed on said pin within the slot. A third pair of plates O are arranged on the inside of the disk and are mounted at their inner ends on the pins M, extending parallel with the plates L and being of equal length. The outer ends of these parallel plates extend across the radial spindle-guiding boxes P, and the spindles I and J extend through said boxes, respectively, and connect the plates, the anti-friction rollers Q being mounted on the spindles and occupying the boxes, and the centers proper $i^3$ $j^3$ being fitted in said spindles. An oval cam R and a square cam S are mounted on the inside end of each of the centers, the oval cam being behind the square one and arranged to bear upon the rail or track T in the usual manner, being held down upon the same by the spring U, connecting the outer end of the inside plate O to the disk, as seen more clearly in Fig. 5. It will be seen that the vibrations of the spindle caused by the oval cam will be directly radial, as the roller N' will travel in the curved slot N and allow this to take place.

The revolution of the spindles is accomplished in the following manner: A pair of counter-shafts V V' are journaled in the frames A A' on either side of the center shaft H, parallel therewith, and on each shaft is mounted a pair of pinions W W'. The arrangement of gears for operating the spindles is exactly the same at each end of the machine, and hence a description of that at one end only will suffice. The pinion W meshes with intermediate gear X, mounted in a stud X', journaled in the casing A, and this gear in its turn meshes with the pinion $v$, similarly mounted.

A double gear-wheel Z is loosely fitted on the sleeve E, surrounding the shaft B, and the outer toothed portion of this gear is engaged by the pinion $v$, while its inner portion Z' meshes with gear-wheel $a$, mounted on the stud $b$, projecting from the plate K, pivoted on the sleeve E, and this latter wheel engages gear $c$, mounted on the pin M, connecting the plates K, L, and O through the slot N in the disk. Through the medium of the intermediate pinion $d$ on a stud $e$, projecting from the plate L, the gear $c$ actuates the gear $f$, rigid on the spindle I, and thereby revolves the same. Motion is imparted to the spindle J in a similar manner through the train of gearing W' $g$ $h$ $i$ $j$ $k$ $l$, the gear $h$ meshing with a wide gear $m$, loose on the double wheel Z intermediate of its two toothed portions, and this loose gear also meshes with the pinion $i$ on the stud of the plate K back of the gear $h$. Thus it will be seen that the spindles revolve independently of each other. The centers of one of the disks are provided on their outer ends with collars $n$, engaged by hand-lever $o$, pivoted to links $p$, projecting from the disk, and said centers are made laterally movable in their bearings, so that they can be thrown out and in by said levers to dog in the blanks, and springs $q$ are disposed behind them to keep them in distended position for properly holding the spokes.

Figure 8:
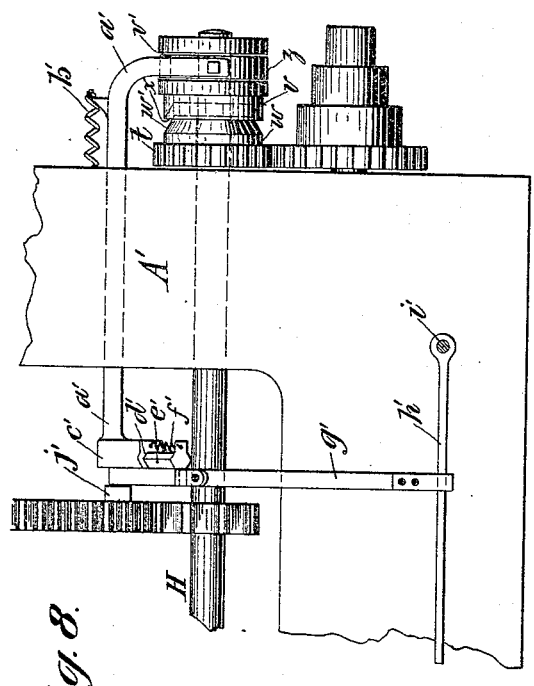
Figure 9:
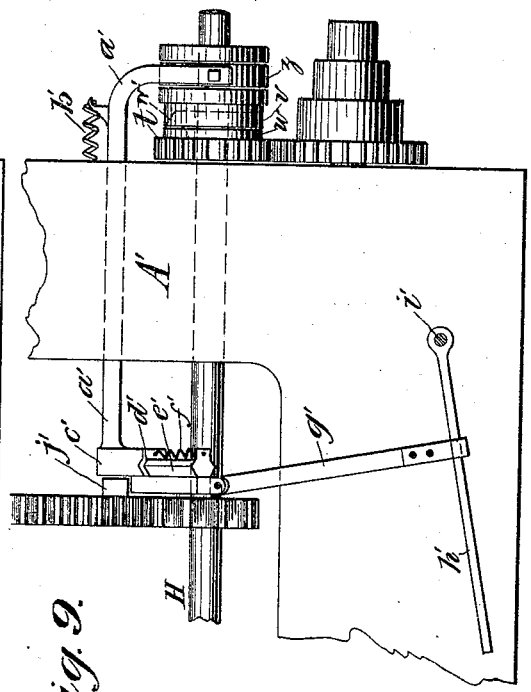

The three shafts B V V' are connected by a train of gearing $r$ $s$ $t$ $s'$ $u$, the gears $r$, $t$, and $u$ being loose on their respective shafts and the intermediate gears $s$ $s'$ mounted on studs $r'$ $r''$, journaled in the casing A'. The central gear $t$ has a projecting hub $w$, having a cone-shaped end $w'$, arranged to be engaged by the corresponding recess $x$ of the sliding friction-clutch $y$, which revolves with the shaft and is provided with a wrist $y'$, fitted by a sleeve $z$, connected at its upper end to a shipper-rod $a'$. This rod extends through the frame A', having a sliding bearing therein, and being connected thereto by a spring $b'$ to keep the clutch in mesh with the hub $w$. The inner end of the rod has a vertical portion $c'$, provided with a dovetailed vertical slot $d'$, in which fits a sliding block $e'$, arranged to be kept normally up to said portion $c'$ by a spring $f'$, and this block is connected by a depending arm $g'$ to a foot-lever $h'$, pivoted to the frame at $i'$. A lug $j'$ projects from the outer face of the disk, and with the parts in their normal position, as shown in Fig. 8, the abutment of this lug against the block $e'$ will throw back the shipper-rod $a'$ and thus release the clutch and stop the revolution of the large disks. It will be seen that upon pressing down upon the foot-lever the sliding block will be drawn down clear of the lug, and the spring $f'$ will immediately act to pull in the shipper-rod and clutch and consequently start the disks, when the lug $j'$ will be carried off and the block will spring back to its normal position. The shafts V V' are also provided with clutch mechanisms, which are alike. Hence but one will be described.

The gear $r$ has a projecting hub $k'$, having a clutch $l'$, arranged to be engaged by corresponding teeth $m'$ of the sliding clutch $n'$, which revolves with the shaft, and is provided with a wrist $o'$, fitted by a collar $p'$. Said collar has pivotally attached to it a lever $q'$ of the first class, having its fulcrum on an arm $r'$, projecting from the frame A', and this lever is connected at its lower end to a long rod $t'$, extending to the other end of the machine and there connected to a second-class lever $u'$, fulcrumed at $u''$ to the frame A. This lever extends up behind the disk F, and is provided with a friction-roller $z'$, which is adapted to be engaged by a lug $a''$, projecting from the periphery of the disk. It will be thus apparent that the lug coming in contact with this lever throws it out, and through the medium of the rod $t'$ and lever $q'$ throws the shaft V out of gear. The clutch will be returned after the lug has passed by a spring X'', connecting it and the frame. On the back side of the machine a shaft A'' is journaled in suitable bearings Q', and on this shaft are loosely mounted a pair of arms C', supporting between their upper ends a second shaft D', on which is mounted intermediate of the arms a cutter-head E', used for squaring the spoke. This cutter-head is rotated by means of a belt F', passing over a pulley G', rigid with said cutter-head, and also around a pulley H' on the shaft A'', said shaft being operated by connection with the counter-shaft V' through the pulley H'' and belt I'.

On the side of one of the arms C' is fastened a box J', in which is fitted a guide or shoe K', which is arranged to project against the square cam S to guide the same in the formation of the spoke-butt. This guide K' is made adjustable in the box J' by means of a screw L', projecting into it and seated in a suitable box M', so that upon turning it the guide will be pushed out or drawn in, and thus rendered adjustable to different-sized cams. The guide is kept up to its work by means of the springs N', connecting the arms C' and the frame A A', and these arms are provided with feet O', projecting inward to keep the squaring-head away from interference with the cutter-heads C.

The preferred manner of constructing my machine having been set forth, I will now proceed to describe its operation. The blank Z'' is dogged between the centers when the latter are directly in front of the shaft B by the hand-lever $o$. The disks F F then carry the blank half-way around the cutter-heads C, being actuated by the pinions G on the shaft H. When this point has been reached, the lug $j'$ on the inside of disk F comes in contact with the block $e'$, connected with the shipper-rod $a'$, and the revolution of the disks will be stopped, as previously explained. In the meantime the barrel of the spoke has been turning by action of the revolving cutter-heads C, and the centers $i^3\ i^3$ have also been revolving by action of the counter-shaft V through the medium of the train of gearing W, X, Y, Z, Z', $a$, $c$, $d$, and $f$, and when the rotary disks have been stopped this revolution will still continue, as the clutch $n'$ is in mesh with the hub $k'$ of the pinion $r$, and gearing $r$, $s$, $t$, $s'$, and $u$ continue to revolve, being, as previously stated, loose on their respective shafts. This revolution of the centers takes place directly in front of the squaring-head E, which is on the back side of the shaft B, and it will be seen that the square cam S has found a bearing on the guide K', and thus the revolution of the cutter-head E will square the head of the spoke to correspond with the shape of the cam. While this squaring operation is in progress it will be seen that the centers $j^3\ j^3$, being located in the disks opposite the centers $i^3\ i^3$, will be in the position first occupied by the latter—that is, directly in front of the shaft B; but these centers $j^3\ j^3$ will have ceased revolving, as the lug $a''$ on the rear side of the disk F has engaged the upper end of the lever $u'$, and, in the manner previously described, slid back the clutch $n'$, thus stopping the revolution of the shaft V', and hence that of the centers, which have been revolved by said shaft through the medium of the train of gearing W' $g\ h\ m\ i\ j\ k\ l$. The stopping of the spindles allows the blanks to be dogged in by hand between the centers $j^3\ j^3$. To start the disks again, the operator presses down upon the foot-lever $h'$, which allows the spring $b'$ to bring the clutch $y$ into mesh with the hub of shaft H, as previously explained, when said shaft will be revolved and the disk again started. As the disks start, the lug $j'$, which has been holding the lever $u'$, will pass from under the latter, and thus allow the clutch $n'$ to return to engagement with the hub $k'$, and hence the revolution of the centers J J will ensue. This second blank will be carried half-way around the cutter-heads in the same manner as the first until it reaches the squaring-head, where it is given like treatment, said first blank having in the meantime been carried on around the cutter-heads to finish the turning of the barrel and tripped out automatically by a projection $m''$ engaging the lever $o$ to throw it back and thus release the finished spoke and allow it to drop.

It is evident that my machine might be varied in many slight ways which would suggest themselves to a skilled mechanic, and hence I do not wish to confine myself to the precise construction herein shown, but consider myself entitled to all such slight variations as come within the spirit and scope of my invention.

Having thus described my invention, what I claim as new, and desire to secure by Letters Patent, is—

1. In a lathe, the combination of rotary disks arranged to be automatically thrown out of revolution, centers and spindles carried by said disks, counter-shafts also arranged to be automatically thrown out of action, and trains of gearing leading from said counter-shafts to the spindles, respectively, whereby the latter are independently revolved, all arranged to operate in the manner and for the purpose described.

2. In a lathe, the combination of rotary disks, a drive-shaft for operating the same, counter-shafts on opposite sides of said drive-shaft, centers and spindles carried by said disks, independent trains of gearing leading from said counter-shafts to said spindles, respectively, and clutches on each of the shafts arranged to be automatically shifted to intermittently revolve the latter, as and for the purpose described.

3. In a lathe, the combination of rotary toothed disks, a drive-shaft having pinions for actuating said disks, centers carried by the latter, counter-shafts located on opposite sides of said drive-shaft and provided with gear-wheels, independent trains of gearing leading from the latter to the centers, respectively, loose gear connecting the drive-shaft and counter-shafts, and clutches on all said shafts arranged to be automatically shifted to intermittently revolve the latter, as and for the purpose set forth.

4. In a lathe, the combination of rotary disks, a drive-shaft for actuating the same, centers carried by said disks, counter-shafts arranged to actuate said centers through independent trains of gearing, a squaring cutter-head behind the disks, a clutch on the drive-shaft arranged to be automatically shifted to stop the revolution of said disks when the blank has been brought in front of said squaring-head, and clutches on the counter-shaft, one of which is arranged to be shifted simultaneously with that on the drive-shaft to stop the revolution of one set of centers and allow the insertion of a new blank while the squaring of the opposite blank is in progress, all arranged to operate in the manner and for the purpose substantially as described.

5. In a lathe, the combination of a pair of toothed disks, a shaft carrying pinions to revolve said disks, centers carried by the disks, counter-shafts also provided with pinions, a loose double gear, a wide gear loose on said double gear, trains of gearing leading, respectively, from said double gear and said wide gear to the pinions on said counter-shafts, and gearing leading, respectively, from said double gear and said wide gear to the different centers to independently rotate the same, substantially as described.

6. In a lathe, the combination of a pair of revolving disks, radially-movable centers carried thereby, cams on said centers, a pair of shafts carrying pinions, a loose double gear, a wide gear loose on the latter and intermediate thereof, and gearing leading from said double gear and said wide gear, respectively, to said radially-movable centers to independently rotate them, as set forth.

7. In a lathe, a rotary disk, plates pivoted to the same and lying contiguous therewith, centers and gearing for actuating the same carried by said plates, radial openings in the disks in which said centers are movable, and slots in said disks in which the pivots of said plates are movable, whereby direct radial movement of said centers is obtained, substantially as set forth.

8. In a lathe, a rotary disk, plates pivoted on the axis of the same, auxiliary plates pivotally connected to said first plates and also to the disks, centers and actuating-gearing carried by said plates, radial openings in said disks in which the centers are movable, and slots in said disks through which the pivots connecting the two sets of plates extend and are movable therein to permit direct radial movement of the centers, as described.

9. In a lathe, a rotary disk, plates pivoted to the same and lying contiguous therewith, centers and gearing for operating the same carried by said plates, radial openings in the disks in which said centers are movable, plates on the opposite side of said disks, also connected at their outer ends to the centers, pivots extending through the disk and both said sets of plates and movable in a slot in the disk to allow direct radial movement of the centers, and springs connecting said second plates and the disk, substantially as and for the purpose described.

10. In a lathe, the combination of rotary disks carrying centers, a shaft carrying pinions for actuating said disks, a sliding clutch on said shaft, a spring-actuated shipper-rod for holding said clutch in mesh, a vertically-sliding block fitting in the inner end of said shipper-rod, a lug on one of the disks arranged to come in contact with said block and push it and the shipper-rod back, thus releasing the clutch, and a foot-lever connected to said block and adapted to be operated to pull down said block and free it of the lug, substantially as and for the purpose described.

11. In a lathe, the combination of rotary disks, revolving centers carried by said disks, counter-shafts carrying pinions, trains of gearing leading from said pinions, respectively, to the centers to revolve the same independently, sliding clutches on said counter-shafts, systems of levers leading from said clutches behind one of said disks, and a lug upon the latter arranged to come in contact with and shift said levers to release the clutch, substantially as and for the purpose described.

12. In a lathe, the combination of rotary disks carrying revolving centers, a shaft carrying pinions actuating said disks, a sliding clutch on said shaft, a shipper-rod connected to said clutch, a lug on one of the disks acting to shift said rod and hence release the clutch, a pair of counter-shafts also carrying pinions, trains of gearing leading from said pinions to said revolving centers, respectively, to actuate the same independently, sliding clutches on said counter-shafts, systems of levers leading from said clutches behind one of said disks, and a lug on said disk arranged to come in contact with and shift said levers to release one of said clutches simultaneously with that on the disk-operating shaft, substantially as and for the purpose described.

13. In a lathe, the combination of rotary disks carrying independent revolving centers, square cams on said centers, means, substantially as described, for automatically stopping the revolution of said disks while that of one set of centers continues, and a squaring device located back of said revolving centers and consisting of a rotary cutter-head mounted in a frame pivotally connected to the main frame, and an adjustable guide arranged to bear against the square cams on the centers, as and for the purpose set forth.

In testimony whereof I affix my signature in presence of two witnesses.

WILLIAM H. LENHART.

Witnesses:
C. H. HUNTER,
CHARLES E. BRONSON.